United States Patent
Stuntebeck et al.

(10) Patent No.: US 9,225,742 B2
(45) Date of Patent: Dec. 29, 2015

(54) MANAGED REAL-TIME COMMUNICATIONS BETWEEN USER DEVICES

(71) Applicant: SkySocket, LLC, Atlanta, GA (US)

(72) Inventors: Erich Stuntebeck, Marietta, GA (US); Evan Hurst, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 0 days.

(21) Appl. No.: 14/222,835

(22) Filed: Mar. 24, 2014

(65) Prior Publication Data
US 2014/0208095 A1     Jul. 24, 2014

(51) Int. Cl.
H04L 29/06     (2006.01)
H04L 9/08      (2006.01)

(52) U.S. Cl.
CPC .............. *H04L 63/168* (2013.01); *H04L 63/06* (2013.01); *H04L 63/105* (2013.01)

(58) Field of Classification Search
CPC ........ H04L 63/168; H04L 9/0861; H04L 9/08
USPC ............... 713/152, 153, 187, 188; 726/4, 5, 7
See application file for complete search history.

(56) References Cited

U.S. PATENT DOCUMENTS

| | | | |
|---|---|---|---|
| 8,533,854 B2 * | 9/2013 | Ginter et al. | 726/27 |
| 2007/0234364 A1 * | 10/2007 | Lipton et al. | 718/102 |
| 2008/0013721 A1 * | 1/2008 | Hwang | 380/44 |
| 2011/0038483 A1 * | 2/2011 | Goeller et al. | 380/282 |
| 2013/0332985 A1 * | 12/2013 | Sastry et al. | 726/1 |
| 2014/0181518 A1 * | 6/2014 | Kim et al. | 713/168 |

OTHER PUBLICATIONS

"The Order of Encryption and Authentication for Protecting Communications"—Hugo Krawczyk, PSU, Jun. 2008 http://citeseerx.ist.psu.edu/viewdoc/download?doi=10.1.1.106.5488&rep=rep1&type=pdf.*

* cited by examiner

*Primary Examiner* — Randy Scott
(74) *Attorney, Agent, or Firm* — Thomas | Horstemeyer, LLP

(57) ABSTRACT

Managed real-time communications between user devices may be provided. Upon receiving a request to instantiate a communication connection from an application, a secure session may be established between the application and a remote application. Input from a user of the application may be received, subjected to at least one management policy, and transmitted to the remote application.

16 Claims, 7 Drawing Sheets

MANAGED REAL-TIME COMMUNICATIONS BETWEEN USER DEVICES

BACKGROUND

Chat and instant messaging (IM) software applications are ubiquitous in the world of electronic communications. Short messages are typically transmitted bi-directionally between two parties, when each user chooses to type in a message and send it to the other. Some IM applications can use push technology to provide real-time text, which transmits messages character by character, as they are composed. More advanced instant messaging can add file transfer, clickable hyperlinks, Voice over IP, or video chat. Multicast chat, or chat rooms, allow multiple users to participate in the online conversation. Existing technical architectures include peer-to-peer (direct point-to-point transmission) or client-server (a central server retransmits messages from the sender to the receiver). Existing solutions, however, fail to offer robust security to the users involved, particularly when enterprise information is exchanged over a public network, such as the Internet.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Managed real-time communications between user devices may be provided. Upon receiving a request to instantiate a communication connection from an application, a secure session may be established between the application and a remote application. Input from a user of the application may be received, subjected to at least one management policy, and transmitted to the remote application.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
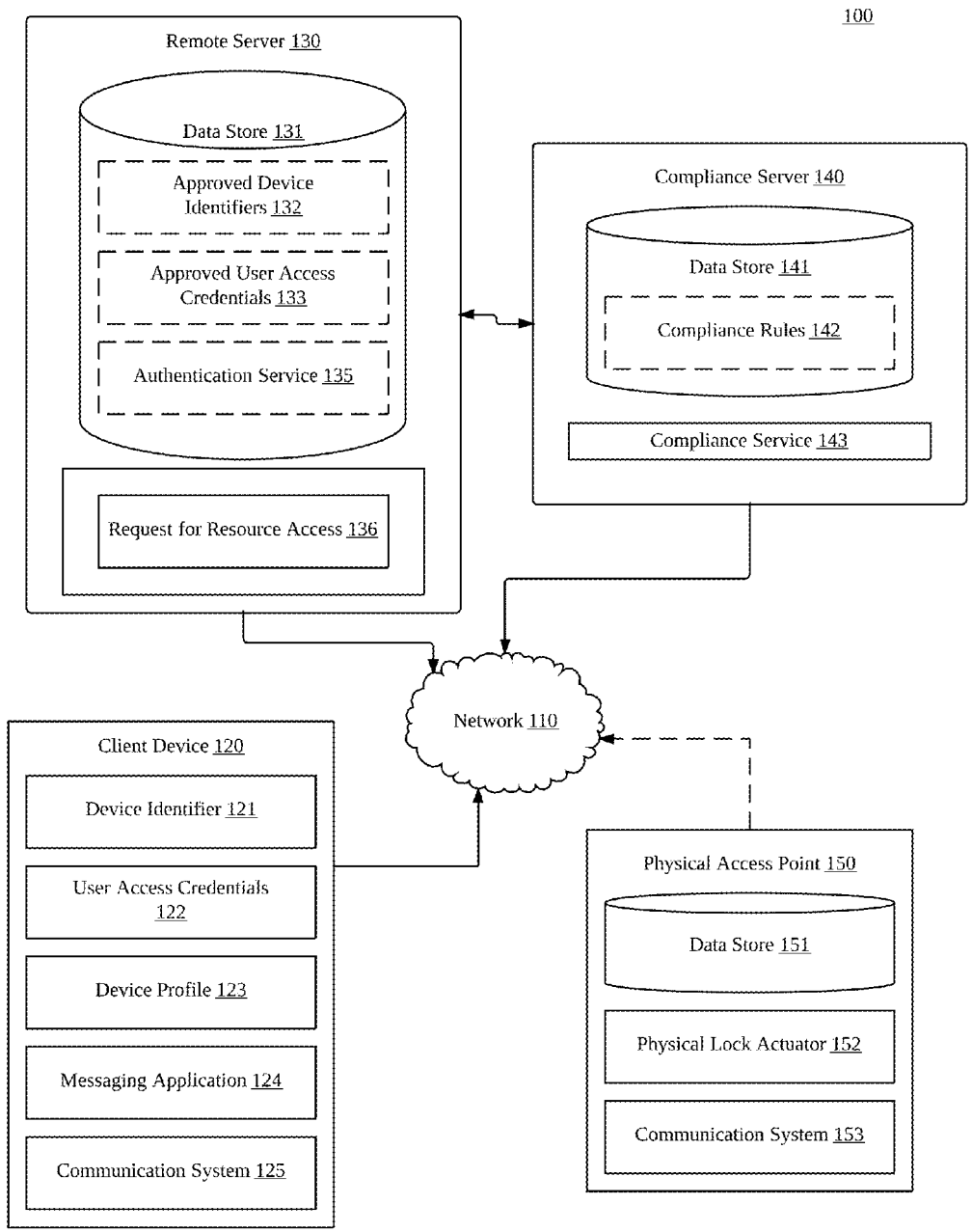
FIG. 1 is a block diagram of an operating environment for providing device management.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Management of real-time communications between users may be provided. Real-time communications may comprise, for example, chat, instant messaging (e.g., AOL® or Yahoo® instant messenger services), video and/or audio messaging, multi-user conferences, chat rooms, text messaging, social media messaging (e.g., Facebook® messenger), Apple® iMessage, Blackberry® Messenger, Google® Hangouts, etc. Such communications are generally expected to be delivered quickly, such that the communication may be received by a recipient user soon after the message is sent. Replies may then be exchanged among various users via a common messaging protocol and/or translated between users on different messaging networks or protocols.

In some embodiments of this disclosure, communications for business purposes may need to be saved, logged, and/or protected from exposure to unauthorized users. For example, sensitive information may be communicated between members of a corporate human resources department that should not be viewable, even by others within the same corporation. In such instances, the messages may be encrypted during transit. In cases where messages between employees are to be saved, logs of the messages and their contents may be saved to a corporate server; these logs may also be encrypted.

Furthermore, some users and/or their devices may be required to comply with management and/or security policies in order to use certain features and/or to communicate with other users at all. For example, a device may need to comply with various security checks such as virus or malware scans, which applications and/or protocols may be used, operating system integrity (e.g., not be 'rooted', 'jailbroken', or otherwise hacked), and/or user, group, and/or device authorizations. Management policies may restrict factors such as times and/or locations in which such messages may be sent and/or received, a quota of resources that may be used by such messaging, who may exchange messages with whom, and/or which user preferences and/or settings may be enforceable.

Compliance with management and/or security policies may be required by an enterprise to prevent remediation actions from being taken. For example, a management policy may require that a device have a passcode set, that a specific application be used for real-time communications, and that only users within the same user group may be messaged during working hours. Security policies may restrict encryption of the message traffic to an encryption key assigned by the enterprise, so that messages may be logged and/or audited, and may prohibit the sending of files or images.

Failure to comply with these policies may result, for example, in restricting an input from being transmitted at all, overriding a user preference associated with the application (e.g., using the enterprise encryption key instead of a personal key), and/or preventing the establishment of a communication session between the users at all.

The security policies may further comprise requirements to protect the content of the communication from unauthorized users. For example, a notification message on the receiving user's device may be prohibited from displaying any and/or all of the contents of the communication until an authorization, such as a passcode or encryption key password, has been entered. In some embodiments, the message may be displayed, but the contents may be obfuscated, such as by blurring or covering text with black boxes. Other restrictions may prevent any and/or all devices participating in the communication from capturing the contents of the message, such as by preventing logging and/or disabling screen capture capabilities. A further refinement may vary a refresh rate associated with different portions of a display of the contents such that attempts to photograph the screen may be blocked or at least allowed to capture only portions of those contents.

The technical effects of some embodiments of this disclosure may include establishing control of access to networks and resources for user devices when access lists may not be predefined, and reducing and/or eliminating the burden of predefining access lists to control access to networks and resources. Moreover, the technical effects of some embodiments may include enhancing network access control by assigning specific access rights based on access lists to client devices authorized to access associated network beacons and resources.

Other technical effects of some embodiments of this disclosure may offer group management solutions to managing content access and distribution. For example, users of a sales group may have read access to marketing documents and presentations, while users in a marketing group may be able to edit and/or annotate the market documents. Similarly, users in an accounting or business services group may be the only ones with access to enterprise financial documents. These access controls may be provided by distributing authorization credentials to devices associated with users of the respective group. Each user may then authenticate to their device, such as by inputting a username, password, authentication key, and/or biometric data, before the device may access and/or retrieve the content authorized for distribution to that device. These authentication types are provided as examples only and are not intended to be limiting as many other types of user authentication are in use and/or may be contemplated in the future.

Content access may be further limited by policies that enforce other compliance restrictions based on properties of the device such as time, location, device security and/or integrity, presence of another device, software versions, required software, etc. For example, educational settings may designate student and instructor groups. These groups may be further assigned to specific classes such that only student group members associated with a given class may access content associated with that class. Further, edit access to the content for the class may be restricted to the user(s) in the instructor group and/or student group members may be permitted to add content that only the instructor may view (e.g., homework assignments.) In some embodiments, the instructor group user(s) may be able to push content to student group user(s) and/or activate temporary control of the students' devices to prevent the devices from accessing non-class related content during class time.

To reduce the cost of ownership of user devices and cellular and/or data service charges associated with use of such user devices, an enterprise such as an educational institution and/or a business may implement a "bring your own device" (BYOD) policy to allow an employee to use his/her personal device to access enterprise resources rather than provide the user with an enterprise owned user device for such purpose. To support such a BYOD policy, a user device administrator (i.e. IT administrator) may manage a group of personally owned user devices, via a management application executed by a management server in communication with the user devices over a network, to provide the user devices with secure access to enterprise resources.

The user device administrator may enroll user devices into the management system to monitor the user devices for security vulnerabilities and to configure the user devices for secure access to enterprise resources. The user device administrator may create and/or configure at least one configuration profile via a user interface provided by the management system. A configuration profile may comprise a set of instructions and/or settings that configure the operations and/or functions of a user device, which may ensure the security of the accessed resources. The user device administrator may, for instance, configure an enterprise email configuration profile by specifying the network address and access credentials of an enterprise email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of users with similar roles, privileges and/or titles.

Access credentials may uniquely identify a client device and/or the user of the client device. For example, the access credentials for a user may comprise a username, a password, and/or biometric data related to facial recognition, retina recognition, fingerprint recognition, and the like. Access credentials related to a device may uniquely identify the device and may comprise, for example, a unique hardware identifier such as a GUID (Globally Unique Identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally, the access credentials may be represented by a unique software identifier such a token or certificate, based at least in part on the aforementioned unique hardware identifiers.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of the user device, such as a personal email configuration profile and an enterprise email configuration profile that are both used for accessing email accounts on the user device.

The user devices may be instructed to enable and/or disable certain configuration profiles according to authorization rights specified by the user device administrator, such as location and/or time-based authorization rights. For example, a BYOD policy may specify that user devices enrolled in the BYOD management system are authorized for personal use outside of the workday and are authorized for business use during the workday. Similarly, a BYOD device may be restricted to enterprise uses while in work locations and/or prohibited from accessing enterprise resources while outside of secure work locations. To implement such a policy, a user device administrator may instruct the user devices to toggle between personal configuration policies and enterprise configuration policies based on factors such as the current time and/or location associated with the user device.

The current time may be based on the current time at the current location of the user device, which may be determined by GPS, Wi-Fi, Cellular Triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9 AM and 5 PM at the current location of the user device, and to disable business configuration profiles and enable personal configuration profiles while the current time is between 5 PM and 9 AM at the current location of the user device.

FIG. 1 illustrates a networked environment 100 according to various embodiments. The networked environment 100 includes a network 110, a client device 120, a remote server 130, a compliance server 140, and a physical access point 150. The network 110 includes, for example any type of wireless network such as a wireless local area network (WLAN), a wireless wide area network (WWAN), and/or any other type of wireless network now known and/or later developed. Additionally, the network 110 includes the Internet, intranets, extranets, microwave networks, satellite communications, cellular systems, PCS, infrared communications, global area networks, and/or other suitable networks, etc., and/or any combination of two or more such networks. It should be understood that embodiments described herein may be used to advantage in any type or combination of wired and/or wireless networks.

In some embodiments, the network 110 facilitates the transport of data between at least one client device, such as client device 120, the remote server 130, the compliance server 140, and the physical access point 150. Client devices may include a laptop computer, a personal digital assistant, a cellular telephone, a set-top device, music players, web pads, tablet computer systems, game consoles, and/or other devices with like capability. Client device 120 comprises a wireless network connectivity component, for example, a PCI (Peripheral Component Interconnect) card, USB (Universal Serial Bus), PCMCIA (Personal Computer Memory Card International Association) card, SDIO (Secure Digital Input-Output) card, NewCard, Cardbus, a modem, a wireless radio transceiver (including an RFID transceiver), near-field communications (NFC) transceiver, and/or the like. Additionally, the client device 120 may include a processor for executing applications and/or services, and a memory accessible by the processor to store data and other information. The client device 120 is operable to communicate wirelessly with the remote server 130 and the physical access point 150 with the aid of the wireless network connectivity component.

Additionally, the client device 120 may store in memory a device identifier 121, user access credentials 122, a device profile 123, and potentially other data. In some embodiments, the device identifier 121 may include a software identifier, a hardware identifier, and/or a combination of software and hardware identifiers. For instance, the device identifier 121 may be a unique hardware identifier such as a MAC address, a CPU ID, and/or other hardware identifiers. The user access credentials 122 may include a username, a password, and/or biometric data related to facial recognition, retina recognition, fingerprint recognition, and the like. Additionally, the device profile 123 may include a listing of hardware and software attributes that describe the client device 120. For instance, the device profile 123 may include hardware specifications of the client device 120, version information of various software installed on the client device 120, and/or any other hardware/software attributes. Additionally, the device profile 123 may also include data indicating a date of last virus scan, a date of last access by IT, a date of last tune-up by IT, and/or any other data indicating a date of last device check.

The client device 120 may further be configured to execute various applications such as an "messaging application" 124. The messaging application 124 may be executed to exchange real-time communications with other client devices. Communication system 125 may be the same or different than the wireless network connectivity component previously discussed, include the same or different communication abilities, and may at least be specifically able to communicate with physical access points 150, discussed below.

The client device 120 may also be configured to execute other applications such as, for example, browser applications, email applications, physical access applications, word processing applications, spreadsheet applications, database applications, and/or other applications. For instance, a browser and/or word processing application may be executed in the client device 120, for example, to access and render network pages, such as web pages, documents, and/or other network content served up by remote server 130, the compliance server 140, and/or any other computing system.

The remote server 130 and the compliance server 140 can each be implemented as, for example, a server computer and/or any other system capable of providing computing capability. Further, the remote server 130, compliance server 140, and any other system described herein may be configured with logic for performing the methods described in this disclosure. Although one remote server 130 and one compliance server 140 are depicted in FIG. 1, certain embodiments of the networked environment 100 include more than one remote server 130 and/or compliance server 140. At least one of the servers may be employed and arranged, for example, in at least one server bank, computer bank, and/or other arrangements. For example, the server computers together may include a cloud computing resource, a grid computing resource, and/or any other distributed computing arrangement. Such server computers may be located in a single installation and/or may be distributed among many different geographical locations. For purposes of convenience, the remote server 130 and the compliance server 140 are each referred to herein in the singular.

Various applications and/or other functionality may be executed in the remote server 130 and the compliance server 140, respectively, according to certain embodiments. Also, various data is stored in a data store 131 that is part of and/or otherwise accessible to the remote server 130 and/or a data store 141 that is part of and/or otherwise accessible to the compliance server 140. The data stored in each of the data stores 131 and 141, for example, may be accessed, modified, removed, and/or otherwise manipulated in association with the operation of the applications and/or functional entities described herein.

The components executed in the remote server 130 include an authentication service 135, and may include other applications, services, processes, systems, engines, and/or functionality not discussed in detail herein. As used herein, the term "authentication service" is meant to generally refer to computer-executable instructions for performing the functionality described herein for authorizing and authenticating client device 120. The authentication service 135 is executed to receive a request for access to resources 136 from an application executed on client device 120 and to determine whether to grant or deny the request 136. Upon determining to grant the request 136, the authentication service 135 may then send access credentials.

The data stored in the data store 131 of the remote server 130 may include, for example, approved device identifiers 132, approved user access credentials 133, physical access credentials, resource access credentials, and potentially other data. The approved device identifiers 132 represents a listing of device identifiers 121 that have been pre-approved for potential accessing physical access credentials 134 which may entitle holders of client devices 120 to access to various resources. The approved device identifiers 132 may have been previously provided to the remote server 130 by a system administrator and/or the like. The approved user access credentials 133 represents a listing of user access credentials 122 that have been pre-approved for potential accessing resource credentials.

The components executed in the compliance server 140 include a compliance service 143, and may include other applications, services, processes, systems, engines, and/or functionality not discussed in detail herein. As used herein, the term "compliance service" is meant to generally refer to computer-executable instructions for performing the functionality described herein for authorizing the device characteristics of another device, such as client device 120. The compliance service 143 is executed to determine whether the device characteristics of the client device 120 comply with the compliance rules 142 that are stored in the data store 141. For instance, the compliance service 143 may identify the device characteristics from the device profile 123 of each client device 120. Additionally, the compliance rules 142 represents a listing of management and security policies, hardware restrictions, software restrictions, and/or mobile device management restrictions that may need to be satisfied by the client device 120 prior to granting the request for resource access 136.

In some embodiments, hardware restrictions included in the compliance rules 142 may comprise restrictions regarding use of specific client devices 120 and specific client device features, such as, for instance, cameras, Bluetooth, IRDA, tethering, external storage, a mobile access point, and/or other hardware restrictions. Software restrictions included in the compliance rules 142 may comprise restrictions regarding the use of specific client device operating systems and/or other applications 125, internet browser restrictions, screen capture functionality, and/or other software restrictions. Mobile device management restrictions included in the compliance rules 142 comprise encryption requirements, firmware versions, remote lock and wipe functionalities, logging and reporting features, GPS tracking, and/or other mobile device management features.

The compliance service 143 may determine whether the device characteristics of a client device 120 satisfy at least one of the restrictions enumerated in the compliance rules 142. For example, the compliance service 143 may determine that a client device 120 that has a camera, Bluetooth capability, and is executing a specified version of an operating system is compliant with the compliance rules 142. As another example, the compliance service 143 may determine that a client device 120 that is associated with an external storage unit and has screen capture functionality enabled is not compliant with the compliance rules 142. All of these restrictions discussed above may affect whether the client device 120 is entitled to use a given resource(s). In some embodiments, however, the compliance service 143 may not be used and physical access authorization may be determined solely based on approved user access credentials 133 and/or approved device identifiers 132.

A user operating a client device 120 may wish to receive at least one resource(s) so that the user may physical access a building, location, door, gate, drawer, filing cabinet, storage unit, cabinet, etc. In some embodiments, the user may interact with an input device to manipulate a network page displayed by a locally executed application, such as a browser application, to generate the request for resource access 136. In some embodiments, the user may manipulate a user interface generated by a locally executed application to generate the request 136. In either case, the user may provide login information and/or the application may automatically retrieve the login information from the memory of the client device 120. Login information may be, for instance, a unique user name, a password, biometric data, and/or other types of user access credentials 122. The application may then communicate the request to the enterprise access application 124, which may generate and transmit the request 136 to the authentication service 135. In some embodiments, the enterprise access application 124 may itself receive the input from the user directly and then transmit the access request 136 to the remote server 130.

Upon receiving the request 136, the authentication service 135 determines whether to grant or deny the request 136. In some embodiments, the authentication service 135 may first authenticate the client device 120 and the user operating the client device 120. To this end, the authentication service 135 determines whether the device identifier 121 associated with the client device 120 matches one of the identifiers listed in the listing of approved identifiers 132. For instance, the device identifier 121 of the client device 120 may be included as part of the request 136 transmitted by the enterprise access application 124. In some embodiments, the authentication service 135 may request the device identifier 121 from the client device 120 in response to receiving the access request 136. Upon identifying and/or receiving the device identifier 121, the authentication service 135 determines whether the device identifier 121 matches one of the approved identifiers 132 stored in the data store 131. In some embodiments, the authentication service 135 may authenticate the client device 120 dynamically by determining whether the device identifier 121 is within a predetermined range of approved device identifiers 132. In some embodiments, the authentication service 135 may authenticate the client device 120 dynamically by performing an algorithm on the device identifier 121.

Additionally, the authentication service 135 may also authenticate the user operating the client device 120 by determining whether the user access credentials 122 associated with the user match one of the credentials in the listing of approved user access credentials 133. For instance, the user access credentials 122 associated with the user on the client device 120 may be included as part of the access request 136 transmitted by the enterprise access application 124. In some embodiments, the authentication service 135 may request the user access credentials 122 from the client device 120 in response to receiving the access request 136. Upon identifying and/or requesting the user access credentials 122, the authentication service 135 may determine whether the user access credentials 122 matches one of the approved user access credentials 133 stored in the data store 131. In some embodiments, the authentication service 135 may authenticate the user operating the client device 120 without also authenticating the client device 120. In other words, certain authenticated users may be authorized to gain the requested physical access regardless of what device they used to submit the resource request 136.

In some embodiments, having authenticated the client device 120 and the user operating the client device 120 as authorized to receive the resource(s), the authentication service 135 communicates with the compliance service 143 to further authorize the client device 120 to receive the resource (s). In some embodiments, the compliance service 143 authorizes the client device 120 by determining whether device characteristics of the client device 120 comply with applicable compliance rules 142. For instance, the compliance service 143 may identify the device characteristics of the client device 120 from the device profile 123. All or part of the device profile 123 may have been provided by the client device 120 in conjunction with the request 136 and/or may be subsequently requested from the client device 120 by the authentication service 135 and/or the compliance service 143. The compliance service 143 then analyzes the device characteristics to determine whether the software restrictions, hardware restrictions, and/or device management restrictions defined in the compliance rules 142 are satisfied and returns the result of the determination to the authentication service 135. In an alternative embodiment, the authentication service 135 may include and perform functionality for determining whether the client device 120 complies with the compliance rules 143.

If the authentication service 135 determines and/or receives a determination that the client device 120 is authorized, the authentication service 135 then associates the client device 120 with at least one resource(s). In some embodiments, the authentication service 135 sends the physical access credentials 134 to the client device 120 and authorizes the client device 120 to use such credentials in connection with accessing physical access points 150. In some embodiments, the authentication service 135 may also send the physical access credentials to physical access point 150.

In some embodiments, the resource(s) may be revoked at any time by the remote server 130. Revocation may occur for any number of reasons, including but not limited to, a change in device profile 123, a change in approved device identifiers 132, a change in approved user access credentials 133, expiration of a defined time period, and/or a request from the user of the client device 120.

In some embodiments, the physical access point 150 is an electro-mechanical device capable of sending and/or receiving information, and in response thereto opening a physical barrier, for example a building, location, door, gate, drawer, filing cabinet, storage unit, cabinet, etc. Depending on the embodiment, the physical access point may or may not be in communication with network 110 and servers and devices connected therewith. In these embodiments, the physical access point may have authorized physical access credentials 134 embedded and/or stored therein, either in a ROM-type storage unit, and/or in a non-networked RAM-type storage unit. A non-networked RAM-type storage unit could be updated locally by direct connection via USB and/or the like, with additional security mechanisms to prevent unwanted tampering/changing of the embedded/stored physical access credentials 134.

The physical access point 150 may include a data store 151 for maintaining data and/or applications which relate to determining whether a client device 120 may be allowed access by the physical access point 150. In some embodiments, the data store 151 may only include a single access code and/or datum that is expected to be matched by any client device 120 providing the same, thereby entitling the client device 120 to access beyond the physical barrier. In some embodiments, the data store 151 may include a plurality of access codes, any of which may be matched by a client device 120 to verify authority to access beyond the physical barrier. The physical access point may have a processor to implement such methods.

The physical access point 150 may also include a physical lock actuator 152, for example, a solenoid and/or other electro-mechanical actuator, which is operable to physically unlock the physical barrier upon command to do so by the physical access point 150. The physical access point may also include a communication system 153 for sending and receiving information with a client device 120 (for example, an RFID transceiver, a wireless radio transceiver, a near field communication device, and/or the like).

Figure 2:
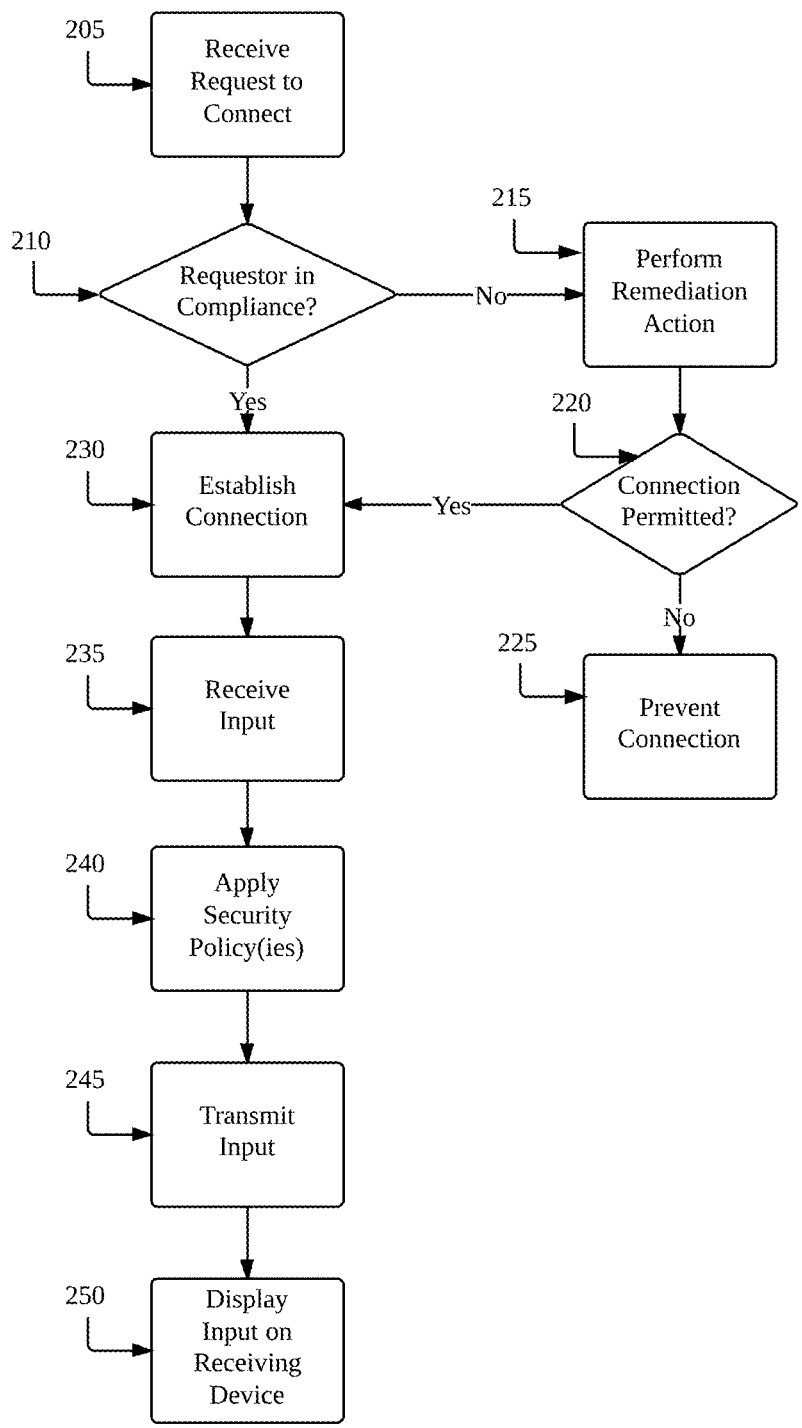
FIG. 2 is a flow chart illustrating a method for managing real-time communications.

FIG. 2 is a flow chart setting forth the general stages involved in a method 300 consistent with embodiments of this disclosure for providing management of real-time communications. Method 200 may be implemented using elements of operating environment 100 as described above, a schematic block diagram 400 and virtual desktop infrastructure (VDI) system 500, as described below. Method 200 is described below with respect to operations performed by a computing device, with the understanding that such a computing device may comprise any number devices programmed for operation of any and/or all of the steps of method 200. The described computing device may comprise, for example, client device 120, remote server 130, compliance server 140, and/or physical access point 150. Ways to implement the stages of method 200 will be described in greater detail below.

Method 200 may begin at stage 205 where a computing device may receive a request to establish a messaging connection. For example, messaging application 124 may attempt to connect to an instant messaging service on a remote server and/or to a corresponding application on another user device. Such a request may comprise any indication from the user and/or another application that a communication connection may be needed, such as an application requesting to report in to a monitoring server, an instantiation of the messaging application 124 and/or the user beginning to enter some sort of input (e.g., typing in a text message input field and/or selecting a 'send-to' command in a user interface.) Communication sessions may comprise peer-to-peer connections between devices associated with the user participants in the message exchange, software communication sessions between application instances executing on the same and/or networked hardware (e.g., virtualized applications), and/or may use client-server connections where a user's input is sent from their client device to a server that then relays the input to the receiving user(s)' client device(s). Either approach may allow for translation between multiple communication protocols to allow the exchange of messages between different clients (e.g., between an Apple® bonjour-based client application and a jabber-based client application).

Method 200 may then advance to stage 210 where the computing device may determine whether the request is in compliance with management and/or security policies. For example, the user may need to belong to a management group permitted to send real-time messages, the application in use may need to be approved or, at least, not disallowed, the computing device may need to comply with hardware, software, and/or configuration restrictions, the input may need to comprise approved content, and/or the recipient may need to belong to an approved list. These are simply examples, and one skilled in the art will recognize that any number of user, application, device, input, network, and other requirements may be associated with such a management policy.

If the request is determined not to be in compliance, method 200 may advance to stage 215 where the computing device may perform a remediation action. For example, the user may have requested to send the message in an unencrypted format. A policy may require that messages sent between enterprise user be encrypted, however. The computing device may therefore require encryption of the message despite the user's preference setting.

Consistent with embodiments of this disclosure, encryption of the message may comprise use of a user and/or device associated encryption key and/or the use of a purposely generated encryption key. For example, client device 120 may request a chat session be established with a chat service executing on remote server 130. Remote server 130 may generate one and/or more encryption key pairs for use during the chat session and provide the appropriate public and private key(s) to client device 120. Remote server 130 may authenticate the key(s) using a certificate authority known to client device 120.

In some embodiments consistent with a communication session between two client devices managed by remote server 130, for example, an encryption key pair may be generated for each client device. The first client device may receive the public and private keys for the first pair, but only the public key for the second pair. The second device may similarly receive the public and private keys for the second pair, but only the public key for the first pair. This allows each client device to encrypt messages that the other client device may decrypt, as well as allowing the remote server 130 to decrypt the messages.

In other embodiments consistent with this disclosure, the remote server may simply distribute public keys associated with the client devices associated with a communication session to all of the other client devices involved, allowing the client devices to encrypt messages for each other and decrypt incoming messages using their own associated private key. These embodiments are intended as non-limiting examples, and other distributions of multiple-use and single-use key pairs are also contemplated by this disclosure.

In some embodiments, the management policy may limit properties of the session based on network characteristics and/or capabilities such as an available bandwidth, an allocated bandwidth (e.g., a given user may not be permitted to use a mobile device's data plan for such an application and/or may be limited in the amount of data that may be used), a latency, a topology (e.g., wired, cellular, Wi-Fi, Bluetooth, etc.), a throughput, and an error rate. Security and/or management levels may be applied as remediation actions to conform to the network capabilities, such as by selecting and/or adjusting an encryption algorithm, an encryption level, an encryption key size, a communication type limitation, a permitted user limitation, a permitted recipient limitation, a communication protocol, a packet size, a compression algorithm, a functionality limitation, etc. Other security limitations and/or remediation actions may prevent a user from using preferences such as off-the-record, or unlogged, sessions and/or may restrict the use of certain message types such as video, images, file, hyperlinks, metadata, etc.

Method 200 may then advance to stage 220 where the computing device may determine if the connection is permitted in light of the remediation action. For example, if the policy found to be in non-compliance at stage 210 has not been brought into compliance at stage 215, the method may advance to stage 225 where the attempt to establish a communication session may be prevented. Such a prevention may accompany a notification to the user requesting the session, informing them that the connection was refused due to non-compliance and/or informing the user what steps need to be taken to allow the connection to proceed (e.g., remove certain applications, activate a passcode lock on the device, connect to a non-public Wi-Fi network, etc.)

Otherwise, if the remediation action resulted in compliance with the policy at stage 215, or if the policy had been found to be in compliance at stage 210, method 200 may advance to stage 230 where the computing device may establish the requested connection. As described above, such a connection may use a peer-to-peer, application-to-application, and/or client/server approach. A mixture of connections is also contemplated, such as where two users may be using virtualized instances of a chat application executing on a single server to communicate with a third user whose chat application is executing on a client device connected to the server over a network.

Method 200 may then advance to stage 235 where the computing device may receive an input from a user. For example, the user may supply audio, video, files, images, program code/instructions, text, and/or other sensory input to client device intended for transmission over the established communication connection.

Method 200 may then advance to stage 240 where the computing device may apply security policies to the input as needed. For example, the computing device may attach metadata to the input comprising information such as application identifiers, user identifiers, device identifiers, a time and/or date of the message input, a level and/or type of encryption applied to or to be applied to the input, a location of any and/or all of the users associated with the communication session. The computing device may scan the unencrypted input for keywords, such as other users, product names, company and competitor names, etc. and apply metadata tags to the input for classification. The keyword scan may also result in the application of a more stringent security policy, such as requiring a higher level of encryption when the message input includes product names or is exchanged between users of a particular group (e.g., HR, legal, or finance).

In some embodiments, application of the security policies may result in a log of the message(s) and/or the associated metadata being sent over the communication session. These logs may be stored in an encrypted and/or unencrypted format. In a client-server based communication session, the server may require that encrypted messages use a key pair with a private key to which the server has access. For example, the server may require the client device(s) to provide the appropriate key pair and/or use a key pair generated by the server for encrypted communications, or the server may have access to an enterprise key store comprising copies of employee users' private keys. The logs may be stored in an encrypted format using the same and/or different key pairs than were used to exchange the messages between users.

Method 200 may then advance to stage 245 where the computing device may cause the input to be transmitted to a recipient. For example, client device 120 may send the input to remote server 130 for relay to another user's client device.

Method 200 may then advance to stage 250 where the computing device may cause the input to be displayed to the recipient. For example, a chat application executing on a remote user's client device may output the received message to a screen for viewing.

In some embodiments, the receiving client device may apply security and/or management policies to the incoming message prior to displaying it. For example, the message may be scanned for viruses and/or spam content. In some embodiments, the receiving application may be operative to display a notification when a new message is received. Security policies may prohibit such a notification, however, such as when an encrypted message is received, and the normal notification display may be disabled, redacted, and/or reduced in detail. For example, a notification that a message has been received may be displayed without details on who the message is from or what the contents may be.

In some embodiments, the message may be hidden while the messaging application is in an insecure state, such as executing on an unlocked device and/or when the user is determined to be away from the device or idle. The away state may be determined by a timeout from the last input received by the user, a specific setting of the state by a user of the application, and/or other factors like distance and/or proximity to a location or another device. For example, the device and/or application may go into an away or idle state when the device loses connection with a Bluetooth headset associated with the user, indicating that the user may have walked away from the client device. In an insecure state, the client device may restrict display of the message and/or obscure parts of the message to prevent access or viewing by an unauthorized viewer. For example, an identification of the user who sent the message may be displayed, but the contents of the message may be obscured by a geometric shape, a blurring of the message, or other graphical effects, as depicted below with respect to FIG. 3B. Such an obscured message may be unobscured and displayed once the insecure state is no longer in place, such as when the user enters a passcode or other authentication.

In some embodiments the computing device may determine whether a new instance of the recipients messaging application has become active. For example, in a peer-to-peer based arrangement, the inputting user's client application may be notified that the intended recipient user has signed on to another device, and that other device has now established a connection. The input may then be caused to be transmitted to the newly connected device instead of and/or in addition to the previously connected device.

Figure 3A:
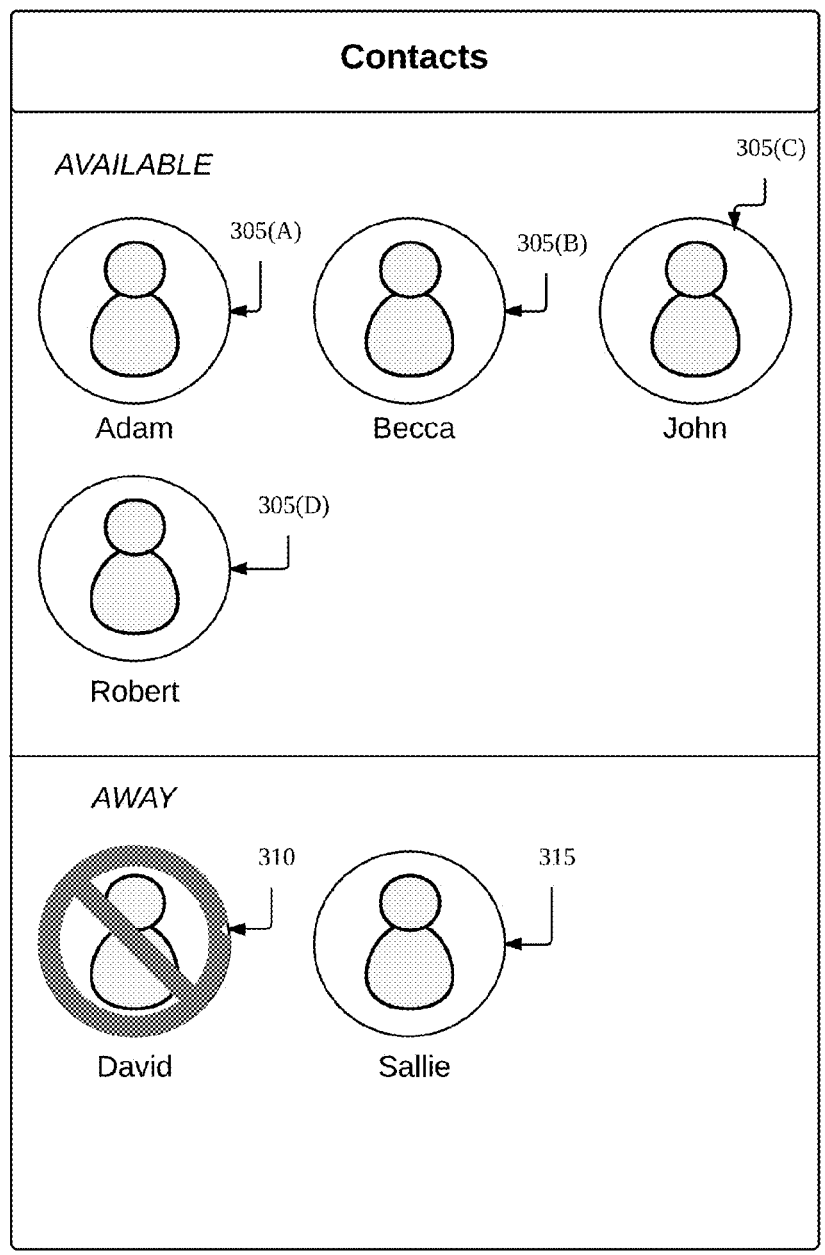
FIGS. 3A-3B are illustrations of a user interface for providing managed real-time communications.
Figure 3B:
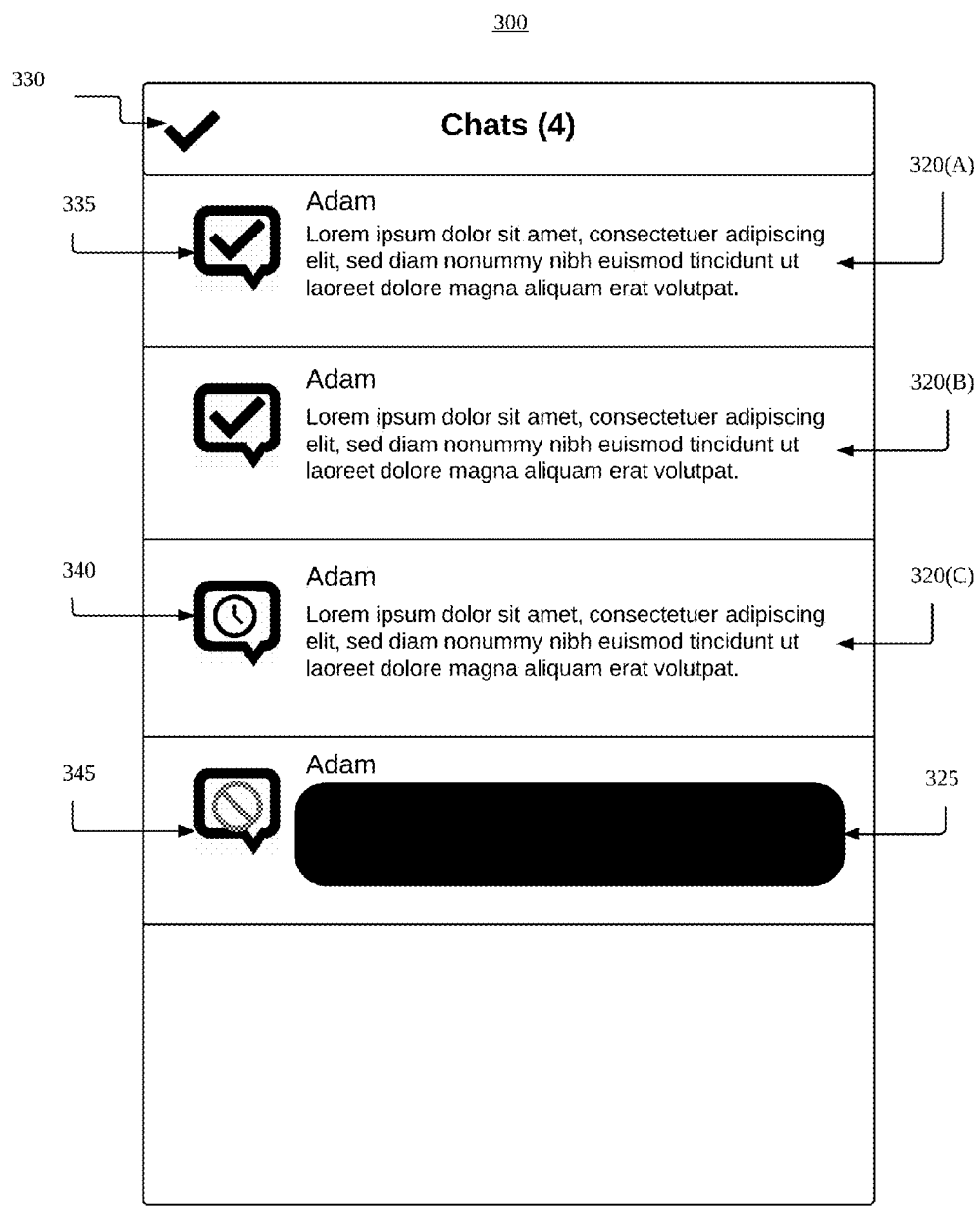

FIGS. 3A-3B are illustrations of an example user interface for providing managed real-time communications among users. FIG. 3A illustrates a user interface 300 for displaying users with whom to communicate comprising a plurality of available users 305(A)-(D), an insecure user 310, and an away user 315. Insecure user 310 and away user 315 may be differentiated by an icon overlay, as illustrated in FIG. 3A, text, color changes, size differences, and/or many other user interface options available to application designers. Such a differentiation may be used to indicate to a sending user that the recipient may be unable to receive a message and/or that additional security policies may be enforced when sending a message to that user.

FIG. 3B illustrates user interface 300 for displaying a plurality of received messages 320(A)-(C), an obscured message 325, and an application state indicator 330. Messages 320 (A)-(C) may be associated with an icon or other indicator to provide additional information, such as an available icon 335, an idle icon 340, and an insecure icon 345. In some embodiments, obscured message 325 may remain in an unviewable state in the display until a user performs an action to authorize display of the underlying message. Such actions may comprise, for example, entering a passcode, providing a biometric reading, bringing the device within proximity of a physical access device, performing a gesture with a client device, etc.

Figure 4:
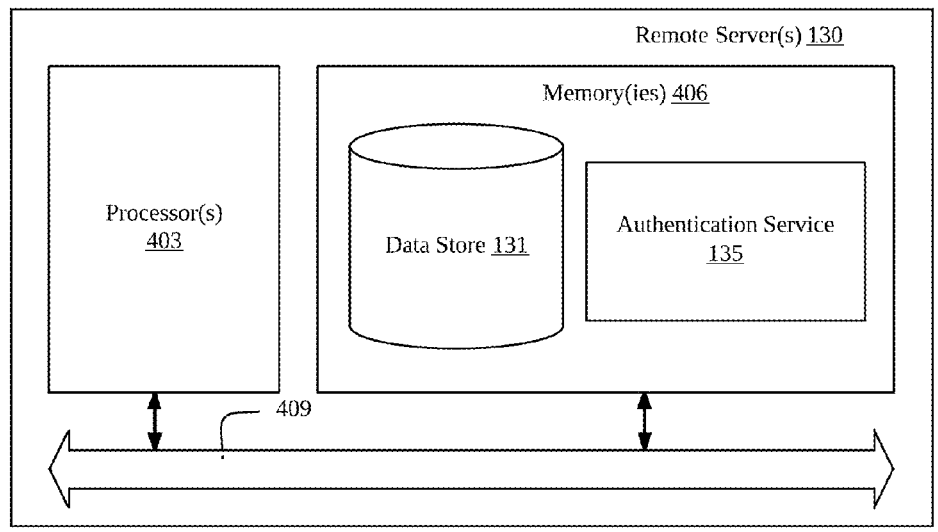
FIG. 4 is a schematic block diagram of a remote server and a client device.
Figure 4:
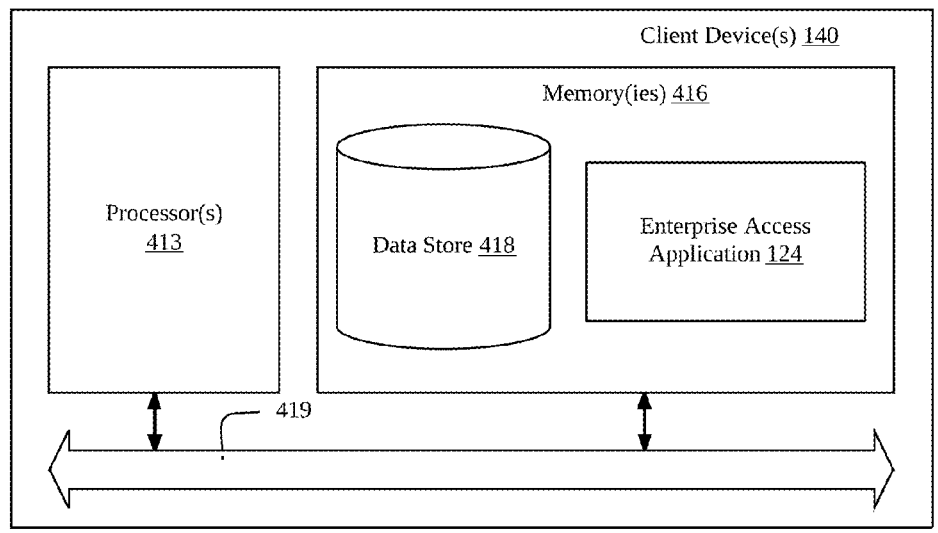

FIG. 4 illustrates schematic block diagram 400 of the remote server 130 and the client device 140 according to embodiments of the present disclosure. The remote server 130 includes at least one processor circuit, for example, having a processor 403 and a memory 406, both of which are coupled to a local interface 409. To this end, the remote server 130 may comprise, for example, at least one server computer and/or like device. Similarly, the client device 140 includes at least one processor circuit, for example, having a processor 413 and a memory 416, both of which are coupled to a local interface 419. Additionally, the client device 120 may be in data communication with a display for rendering user interfaces and at least one other I/O device for inputting and outputting data. To this end, the client device 140 may comprise, for example, at least one mobile wireless device, computer, and/or like device. The local interfaces 409 and 419 may comprise, for example, a data bus with an accompanying address/control bus and/or other bus structure as can be appreciated.

Stored in the memories 406 and 416 are both data and several components that are executable by the processors 403 and 413. In particular, stored in the memory 406/416 and executable by the processors 403 and 413 are a authentication service 135, an enterprise access application 124, and potentially other applications. Also stored in the memories 406 and 416 may be a data stores 131 and 418 and other data. In addition, an operating system may be stored in the memories 406 and 416 and executable by the processors 403 and 413.

It is to be understood that there may be other applications that are stored in the memories 406 and 416 and are executable by the processors 403 and 413 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, and/or other programming languages.

A number of software components are stored in the memories 406 and 416 and are executable by the processors 403 and 413. In this respect, the term "executable" means a program file that is in a form that can ultimately be run by the processors 403 and 413. Examples of executable programs may be, for example, a compiled program that can be translated into machine code in a format that can be loaded into a random access portion of the memories 406 and 416 and run by the processors 403 and 413, source code that may be expressed in proper format such as object code that is capable of being loaded into a random access portion of the memory 406/416 and executed by the processors 403 and 413, and/or source code that may be interpreted by another executable program to generate instructions in a random access portion of the memories 406 and 416 to be executed by the processors 403 and 413, etc. An executable program may be stored in any portion and/or component of the memories 406 and 416 including, for example, random access memory (RAM), read-only memory (ROM), hard drive, solid-state drive, USB flash drive, memory card, optical disc such as compact disc (CD) and/or digital versatile disc (DVD), floppy disk, magnetic tape, and/or other memory components.

The memories 406 and 416 is defined herein as including both volatile and nonvolatile memory and data storage components. Volatile components are those that do not retain data values upon loss of power. Nonvolatile components are those that retain data upon a loss of power. Thus, the memories 406 and 416 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Also, the processors 403 and 413 may represent multiple processors, and the memories 406 and 416 may represent multiple memories that operate in parallel processing circuits, respectively. In such a case, the local interfaces 409 and 419 may be an appropriate network 109 (FIG. 1) that facilitates communication between any two of the multiple processors 403 and 413, and/or between any two of the memories 406 and 416, etc. The local interfaces 409 and 419 may comprise additional systems designed to coordinate this communication, including, for example, performing load balancing. The processors 403 and 413 may be of electrical and/or of some other available construction.

Although the authentication service 135, the enterprise application service 124, and other various systems described herein may be embodied in software and/or code executed by general purpose hardware as discussed above, as an alternative the same may also be embodied in dedicated hardware and/or a combination of software/general purpose hardware and dedicated hardware. If embodied in dedicated hardware, each can be implemented as a circuit and/or state machine that employs any one of and/or a combination of a number of technologies. These technologies may include, but are not limited to, discrete logic circuits having logic gates for implementing various logic functions upon an application of at least one data signal, application specific integrated circuits having appropriate logic gates, and/or other components, etc.

Figure 5:
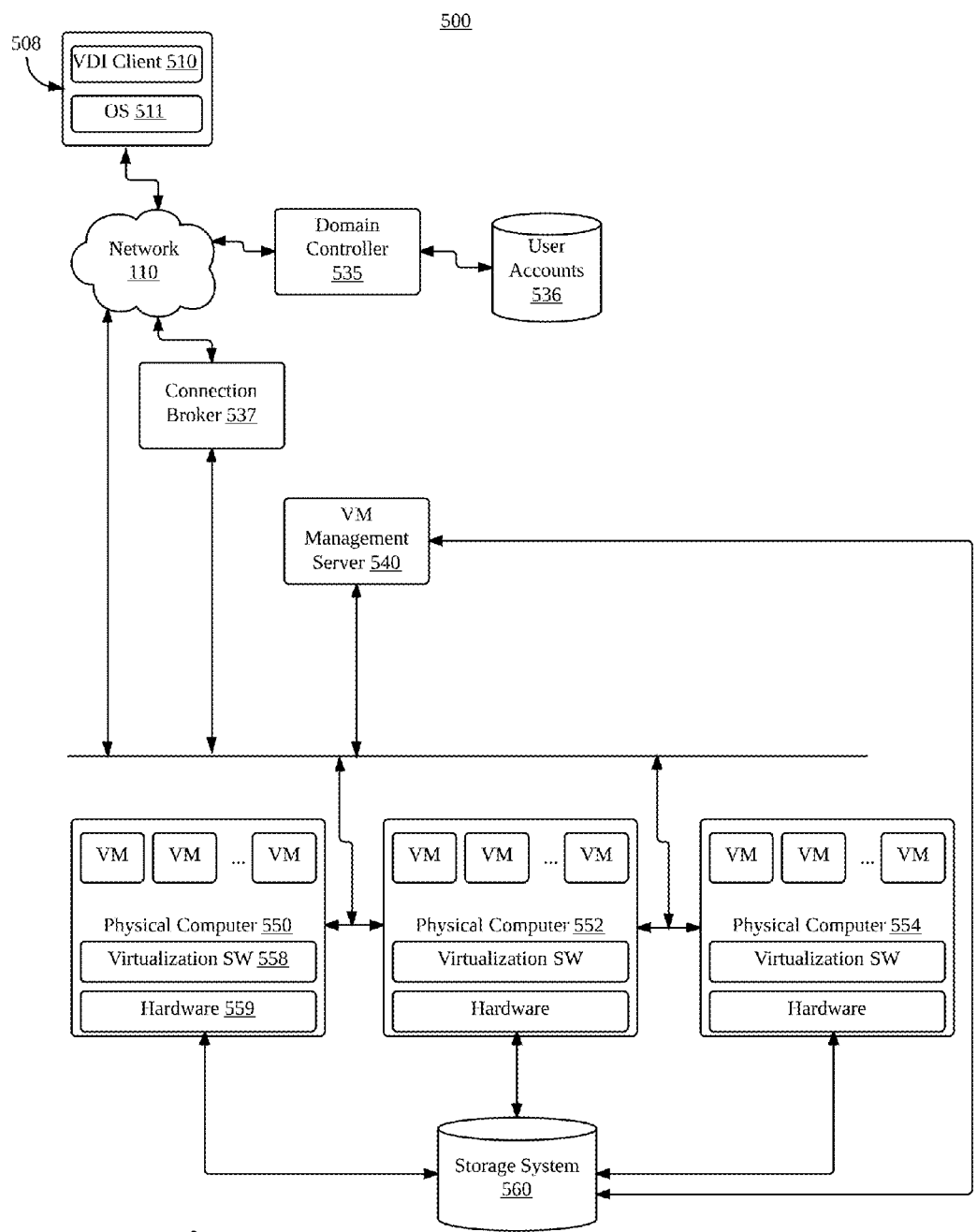
FIG. 5 illustrates components of a virtual desktop infrastructure (VDI) system in which embodiments of the present disclosure may be implemented.

FIG. 5 illustrates components of a virtual desktop infrastructure (VDI) system 500 in which embodiments of the present disclosure may be implemented. In VDI system 500, VDI client software programs such as VDI client 510, run on operating systems of local computing devices, e.g., client machine 508 on top of an operating system (OS) 511. VDI clients provides an interface for the users to access their desktops, which may be running in one of virtual machines 557 or blade server (not shown) in a data center that is remote from the users' locations. The term "desktop" may refer to the instance of an interactive operating environment provided by a computer operating system and software applications, typically in the form of a display and sound output and keyboard and mouse input. With VDI clients, users can access desktops running in a remote data center through network 110, from any location, using a general purpose computer running a commodity operating system and a VDI client software program such as VMware® View, or a special purpose thin client such as those available from Dell, HP, NEC, Sun Microsystems, Wyse, and others.

VDI system 500 may include a domain controller 535, such as Microsoft® Active Directory® that manages user accounts 536 including user log-in information, and a connection broker 537 that manages connections between VDI clients and desktops running in virtual machines 557 or other platforms. Domain controller 535 and connection broker 537 may run on separate servers or in separate virtual machines running on the same server or different servers. In the embodiments of the present disclosure illustrated herein, desktops are running in virtual machines 557 are instantiated on a plurality of physical computers 550, 552, 554, each of which includes virtualization software 558 and hardware 559. Physical computes 550, 552, 554 may be controlled by a virtual machine management server 540, and be coupled to a shared persistent storage system 560.

All of the components of VDI system 500 communicate via network 110. For simplicity, a single network is shown but it should be recognized that, in actual implementations, the components of VDI system 500 may be connected over the same network or different networks. Furthermore, a particular configuration of the virtualized desktop infrastructure is described above and illustrated in FIG. 5, but it should be recognized that one or more embodiments of the present disclosure may be practiced with other configurations of the virtualized desktop infrastructure.

Figure 6:
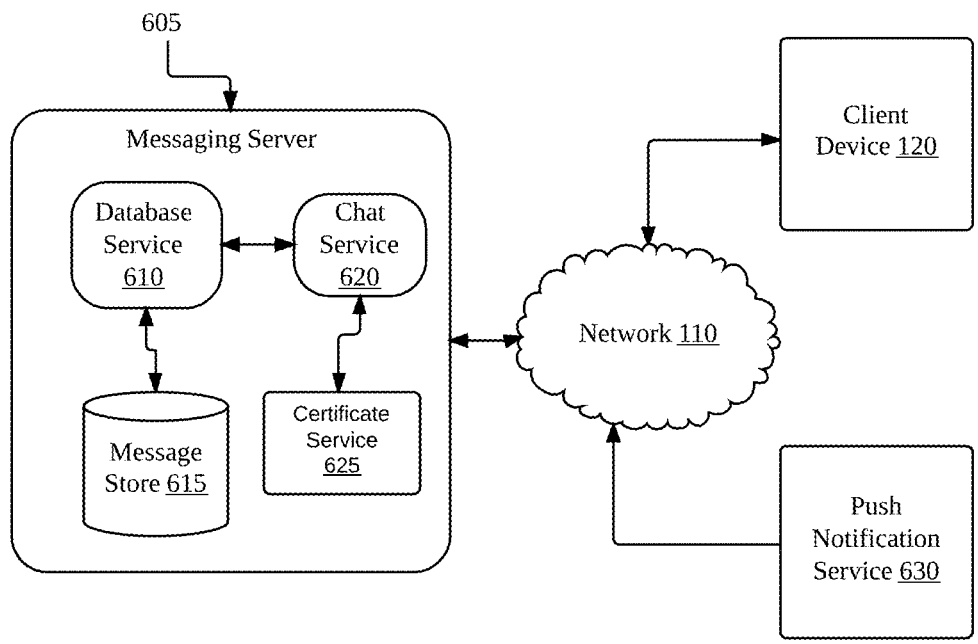
FIG. 6 is a block diagram of an example client-server messaging architecture.

FIG. 6 is a block diagram of an example client-server messaging architecture 600. Architecture 600 may comprise a messaging server 605 operative to communicate with client device 120 and a push notification service 630. In some embodiments, messaging server 605 may coincide with remote server 130. In some embodiments, push notification service 630 may execute on messaging server 605 and/or on a separated computing device.

Messaging server 605 may comprise a database service 610 coupled to a message store 615 (e.g., an SQL database) stored in a memory (not shown) of messaging server 605. Database service 610 may store and/or log messages being sent and/or received by a chat service 620 allowing for synchronous and/or asynchronous delivery of the messages to client device 120. Chat service 620 may utilize a certificate service 625 to generate and authenticate encryption key pairs.

Messaging server 605 may retain messages after they are fetched and/or pushed to client device 120. Messages may be re-fetched and/or re-pushed to client device 120 and/or to other instances of a chat application, such as may be executed on another device. All messages, user information, device information, encryption keys, and metadata may be stored in message store 615.

Embodiments consistent with this disclosure contemplate device and server initiation of communication sessions for messaging purposes. Client device 120 and/or messaging server 605 may generate an encryption key pair for use in a given messaging session and/or for use in multiple sessions. In a client initiation model, for example, client device 120 may authenticate with messaging server 605, such as through authentication service 135 as described above. Once messaging server 605 authenticates client device 120, which may require authorization of the device itself as well as an authorization of the user of client device 120, client device 120 may generate a key pair, such as a 2048 bit RSA key pair, and send the public key to messaging server 605. Messaging server 605 may then confirm receipt of the public key and allow the establishment of a communication session between client device 120 and chat service 620 over network 110.

All messages may be encrypted with an AES key of a size (e.g., 128 bit, 256 bit, etc.) appropriate to the capabilities of network 110. Each messaging session between different users and/or devices may use a different symmetric key. In some embodiments, these keys will cycle even in a single conversation. A symmetric key may be generated on the devices of any of the users involved in the communication session and/or by messaging server 605.

When a first user adds a second user to a session, the first user may encrypt a copy of the symmetric encryption key with the second user's public key. This key may then be sent to the second user via messaging server 605, which may sign the key via certificate service 625. The second user then decrypts the symmetric key with their private key.

Push notification service 630 may be used to inform client device 120 that messages intended for client device 120 were received by messaging server 605 while the device was out of communication. For example, a user may receive notifications via push notification service 630 that several messages were received while client device 120 was turned off. Those messages may be automatically transmitted to client device 120 once communications are re-established and/or the user and/or client device may need to be re-authorized. In some embodiments, a new encryption key pair may be generated after communication between messaging server 605 and client device 120 is disrupted.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, non-transitory media, and/or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a request to instantiate a communication connection from an application;
   generating a session encryption key pair comprising a public key and a private key,
   establishing a secure session between the application and a second application according to the session encryption key pair;
   receiving an input from a user of the application;
   applying at least one management policy to the input of the user of the application; and
   causing the input to be transmitted to the second application;
   determining whether a device associated with the user is in compliance with at least one second management policy; and
   in response to determining that the device associated with the user is not in compliance with the at least one second management policy, applying a remediation action associated with the at least one second management policy to the device, the remediation action comprising overriding a user preference associated with the application.

2. The method of claim 1, wherein the remediation action comprises:
   restricting the input from being transmitted to the second application.

3. The method of claim 1, wherein the remediation action comprises:
   preventing the establishment of the secure session between the application and the second application.

4. The method of claim 1, wherein establishing the secure session between the application and the second application comprises establishing the secure session with a server application.

5. The method of claim 1, wherein establishing the secure session between the application and the second application comprises establishing the secure session with a peer client application.

6. The method of claim 1, wherein the at least one management policy comprises a security requirement associated with at least one of the following: the user, the application, the device, the input, and the second application.

7. The method of claim 6, wherein the security requirement comprises at least one of the following: a logging requirement, an encryption level requirement, an input display restriction, a capture prevention requirement, and a resource consumption limitation.

8. A system comprising:
   a memory storage; and a processor coupled to the memory storage, wherein the processor is configured to:
receive a request to establish a secure session between a first application and a second application,
generate at least one session encryption key pair comprising a public key and a private key,
provide the public key of the at least one session encryption key pair to the first application,
provide the private key of the at least one session encryption key pair to the second application,
receive at least one message encrypted according to the at least one session encryption key pair from the first application,
apply at least one management policy to the received at least one message,
transmit the at least one message encrypted according to the at least one session encryption key pair to the second application,
generate a second session encryption key pair comprising a second public key and a second private key,
provide the second public key to the second application, and
provide the second private key to the first application.

9. The system of claim 8, wherein the first application and the second application comprise two instances of the same application executing on the system.

10. The system of claim 8, wherein the first application comprises a first instance of a software application executed on a first remote device and the second application comprises a second instance of the software application executed on a second remote device.

11. The system of claim 8, wherein the processor being configured to apply the at least one management policy to the received at least one message comprises the processor being configured to:
decrypt the at least one message encrypted according to the at least one session encryption key pair; and
log the decrypted at least one message; and
encrypt the log of the decrypted at least one message according to a certified encryption key associated with the system.

12. The system of claim 11, wherein the log of the decrypted at least one message further comprises at least one of the following: a first identifier associated with the first application, a second identifier associated with the second application, a first user identifier associated with a first user of the first application, a second user identifier associated with a user of the second application, a time associated with the decrypted at least one message, a date associated with the decrypted at least one message, and metadata associated with the decrypted at least one message.

13. A non-transitory computer-readable medium which stores a set of instructions that when executed performs a method executed by the set of instructions comprising:
receiving a request to establish a communication connection between a first messaging application and a second messaging application;
determining whether at least one first management policy prohibits the establishment of the communication connection; and
in response to determining that the at least one first management policy does not prohibit the establishment of the communication connection:
identifying a network capability available for establishing the communication connection,
establishing a secure communication connection between the first messaging application and the second messaging application, wherein the secure communication connection comprises a level of security dependent on the network capability,
receiving an input from a user of the first messaging application;
applying at least one second management policy to the input of the user of the first messaging application, and
causing the input to be transmitted to the second messaging application,
receiving a second input from a user of the second messaging application,
determining whether the first messaging application is associated with an insecure state, and
in response to determining that the first messaging application is associated with an insecure state, preventing the second input from being accessed by an unauthorized user.

14. The non-transitory computer-readable medium of claim 13, wherein the network capability comprises at least one of the following: an available bandwidth, an allocated bandwidth, a latency, a topology, a throughput, and an error rate.

15. The non-transitory computer-readable medium of claim 13, wherein the level of security dependent on the network capability comprises at least one of the following: an encryption algorithm, an encryption level, an encryption key size, a communication type limitation, a permitted user limitation, a permitted recipient limitation, a communication protocol, a packet size, a compression algorithm, and a functionality limitation.

16. The non-transitory computer-readable medium of claim 13, further comprising:
determining whether a new instance of the second messaging application has become active; and
in response to determining that the new instance of the second messaging application has become active:
receiving a second input from the user of the first application;
applying the at least one second management policy to the input of the user of the first application, and
causing the second input to be transmitted to the new instance of the second application.

\* \* \* \* \*